(12) United States Patent
Lang et al.

(10) Patent No.: US 7,198,378 B2
(45) Date of Patent: Apr. 3, 2007

(54) SUPPORT ARM FOR VEHICLE MIRROR

(75) Inventors: Heinrich Lang, Ergersheim (DE);
Jurgen Pfanz, Schillingsfurst (DE);
Markus Meier, Nordheim (DE);
Rudolf Mayer, Gebsattel (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 114 days.

(21) Appl. No.: 10/982,936

(22) Filed: Nov. 5, 2004

(65) Prior Publication Data

US 2005/0122605 A1 Jun. 9, 2005

(51) Int. Cl.
*G02B 7/182* (2006.01)
*A47G 1/24* (2006.01)

(52) U.S. Cl. ...................... 359/872; 248/476

(58) Field of Classification Search ........... 359/871, 359/872, 875, 876, 877; 248/476
See application file for complete search history.

(56) References Cited

U.S. PATENT DOCUMENTS

| | | | |
|---|---|---|---|
| 5,760,980 A * | 6/1998 | Lang | 359/872 |
| 6,690,268 B2 * | 2/2004 | Schofield et al. | 340/438 |
| 2004/0051983 A1 | 3/2004 | Lang | |

FOREIGN PATENT DOCUMENTS

| | | | |
|---|---|---|---|
| DE | 32 48 759 A1 | 7/1984 |
| DE | 36 02 188 A1 | 8/1987 |
| DE | 295 04 245 U1 | 1/1996 |
| EP | 0 90 909 A2 | 10/1983 |
| EP | 0 590 510 B1 | 4/1994 |
| EP | 0 697 311 B1 | 2/1996 |
| EP | 1 013 502 | 6/2000 |
| EP | 1 013 502 A | 6/2000 |
| EP | 1 024 051 | 8/2000 |
| EP | 1 024 051 A2 | 8/2000 |
| WO | WO 02/14923 A1 | 2/2002 |

* cited by examiner

*Primary Examiner*—Alessandro Amari
(74) *Attorney, Agent, or Firm*—McNair Law Firm, P.A.

(57) ABSTRACT

A support arm for a vehicle mirror having at least one mirror head with a mirror pane which includes an upper holding arm (1) made of plastic with an anchoring element (2) for mounting on a vehicle, and a lower holding arm (3) made of plastic with an anchoring element (4) at the bottom for mounting on a vehicle. A one-piece base (6) includes a metal tube (5) whose top or, as the case may be, bottom end is securely connected with the upper and lower holding arm, respectively. The base can also be built in the form of a base plate. In this case, the base has a removable positioning wedge (7) that can be removed from the base to change the angle of at least one mirror pane and/or mirror head carried by the base. The positioning wedge is attached to provide an exterior driver-side rear view mirror, and is removed to provide a passenger-side rear view mirror.

19 Claims, 7 Drawing Sheets

SUPPORT ARM FOR VEHICLE MIRROR

BACKGROUND OF THE INVENTION

This invention relates to a rear view mirror assembly for a vehicle, and more particularly to a support arm for a vehicle mirror assembly, especially commercial vehicles.

Heretofore, vehicle mirrors have been provided which encompass at least one mirror head having at least one mirror pane. This mirror pane can be installed in a mirror housing to be either fixed or adjustable or it can be secured directly in a frame. Furthermore, if need be, an adjusting mechanism to adjust the mirror pane relative to the housing, as opposed to the entire housing, can be included. In a simplified variant, the mirror housing is fastened to an essentially U-shaped metal tube bracket whose two ends are then fastened to bearing blocks mounted to the vehicle. For example, in EP 0 090 909 A3, the adjusting mechanism is fixed to the tube bracket by clamping. In the EP 0 590 510 B1, the housing itself is attached to the tube bracket by clamping. The tubing can then be secured to the bearing blocks mounted to the vehicle. In addition, EP 0 697 311 B1 suggests fastening plastic bearing blocks to the metal tube bracket using a tooth/detent arrangement to enable an angular adjustment of the tube bracket. Although this design is very stable and simple, it has several disadvantages. First, the mirror pane is installed with friction. Secondly, the design is aerodynamically disadvantageous and increases the unfavorable effects of drive resistance and strain resulting from the force of the wind. In addition, the tube bracket, which is completely metal for stability reasons, is also heavy. With the additional plastic bearing blocks, a multitude of individual parts are necessary. This makes the manufacture and the assembly complex and expensive. For this EP 1 024 051 A3 suggests a one-piece support arm with two holding arms and one connection piece connected between the holding arms. The mirror carrier plate can be fixed to the connection piece of the support arm (which is manufactured entirely of plastic) by means of complementary fixing assemblys. This design also has several disadvantages. The mirror housings that were designed for the above-described tube bracket versions cannot be fastened to the support arm requiring several housings to be on hand. Also, in the event of an "upgrade" to a plastic support arm (which is more aerodynamically favorable and lighter), the housing can no longer be used. On the other hand, mirror panes with frames cannot simply be attached to the support arm without a housing. Furthermore, the attachment of the support arm, which is completely manufactured of plastic, is reduced which leaves the attached mirror exposed to vibrations that are wind induced or transferred by the vehicle. A corresponding fastener is necessary for a stable attachment of the housing to the connection piece so that it is not possible by simple turning to use the same support arm for right-hand and left-hand driven vehicles as is the case with the above described tube bracket version, for example. In the driving direction, the driver's mirror is the left external mirror in left-hand driven vehicles and thus is turned around the vertical axis of the vehicle then the passenger side right-hand mirror. In the case of right-hand driven vehicles, this is exactly the opposite. Therefore, up to now it has been necessary to provide four variants, i.e. driver/passenger vehicle for right/left-hand driven.

Accordingly, an object of the present invention is to provide a support arm for a vehicle mirror that has a greater stability and reduced vibrations.

Another object is to provide a support arm for a vehicle mirror that can be used for both driver and passenger mirrors for both right and left-hand driven vehicles.

SUMMARY OF THE INVENTION

The above objectives are accomplished according to the present invention by providing a support arm for a vehicle mirror including at least one mirror head, an upper holding arm made of plastic having an upper attachment element for fastening the vehicle, a lower holding arm made of plastic having a lower attachment element for fastening to the vehicle, and a one-piece base assembled with the upper and lower holding arms. The base includes a metal tube whose upper and lower ends are connected securely to the upper and lower holding arms.

The metal tube is made integral with the holding arms providing a support arm having a high stability, especially when considering the wind load and the vibrations coming from the vehicle. Furthermore, it makes it possible to utilize mirror heads that were designed for traditional bracket tubes. Therefore, the same mirror heads can advantageously be utilized for both traditional tube brackets, as well as supporting arms.

As opposed to the above described one-piece plastic support arm, the metal tube especially offers the possibility for better attachment because corresponding attachment elements are attached directly to the metal tube and not to softer plastic. Up until now, with all known attachment types (positive fit, plug connections, screwing, clamping), the stability of the mirror head-support arm connection decreases as a result of aging and deterioration of the plastic.

As opposed to the familiar U-shaped tubing that is completely made of metal, the support arm has the advantage of reduced weight and greater design freedom with respect to aerodynamics. However, because the metal tube can be advantageously shaped to be identical to the cross web, the same mirror heads can be utilized.

To further strengthen the plastic holding arms, at least one of these arms can encompass one or several embedded parts, preferably of metal. In this way, it is advantageously possible to keep the wall thickness in especially stressed areas thin. This saves not only material costs, but also helps avoid an undesirable material depression in manufacturing.

As mentioned in the introduction, in the present application "mirror head" is understood to be at least one mirror pane with its holding frame or housing, in which the mirror pane is assembled to be fixed or adjustable. This is referring especially to the publications named in the introduction.

To be especially cost efficient, a support arm according to the invention, can be manufactured so that the metal tube is fastened at its end by injection to the upper and/or lower holding arm. The metal tube is inserted in the casting mold and plastic forming the holding arms is injected in such a way that it surrounds the spot facing from within or outside and the support arm is integrally manufactured. The metal tube is extrusion coated from within with a plastic tube that is integrally formed with the upper and/or support arm. A fluid or, as the case may be, gas internal pressure process is suitable for the injection of the hollow plastic tube within the metal tube.

Likewise, the metal tube can be attached to the upper and/or lower holding arm by means of form fit or friction fit. For example, the metal tube can form fit under pressure into bores provided for this in the upper or lower holding arms or have tooth systems such as spline shaft profiles or fit-in keys.

Likewise, the metal tube can be secured to the upper and/or lower holding arms by adhesive. The types of fasteners explained above can be mixed to attach the metal tube to the holding arms. One method can be selected for attachment to the upper holding arm and another for attachment to the lower holding arm.

Preferably, the metal tube and/or the upper (lower) holding arm has a tooth/detent system for locking on at least one mirror head in an angular position. For example, this system can be placed in the middle of the metal tube; this enables a very secure lock when installing a mirror head with a corresponding complementary tooth system at a specific angle. Alternatively or additionally, the area on the upper and/or lower holding arm in which or to which the tube is connected can also have a corresponding tooth/detent system. In this application, tooth/detent system always means all devices for form fit rotary fixing, such as inner/outer tooth system, spline shaft profiles, fit-in keys, raster or the like.

The upper and/or lower attachment elements can encompass a fixed angle raster for fixing the support arm to the vehicle. For this reference is made to European patent EP 0 697 311 B1 referenced in the introduction, for example. Because the attachment devices in the plastic holding arms are integrated, the additional manufacturing and attachment of separate attachment devices such as rasters or the like becomes advantageously unnecessary.

According to a second embodiment of the present invention, a support arm for a vehicle mirror with at least one mirror head encompasses a base that is formed in the shape of a base plate. During manufacture the base has a removable positioning wedge for the anglular rotation of the mirror head(s). The positioning wedge is designed so that it fixes the mirror head(s), especially the mirror pane(s) in at a greater angle which corresponds to the natural position of a passenger side mirror in a left or right-hand driven vehicle. The positioning wedge is preferably made of plastic and contains rated break points to break off material. When the positioning wedge is removed and the mirror head(s), especially the mirror pane(s), is secured in a slightly rotated position, the corresponding natural position of a driver side vehicle in a left or right-hand driven vehicle is provided.

According to the second embodiment, a base plate with a positioning wedge is initially assembled during manufacture. For this, an injection molding procedure is advantageously suitable when the base plate is manufactured of plastic. Subsequently the positioning wedge is removed in the event that a mirror head should be fixed in only a slight angle position relative to the base plate. The positioning wedge can also be removed later, i.e. not just directly at manufacturing or the first assembly. However, in the event that the mirror head should be more sharply inclined in contrast to the base plate, the positioning wedge should not be removed.

Advantageously, the first and second embodiments of the present invention can be combined in that the metal tube of the first design can carry the base plate with the positioning wedge of the second design.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now to the drawings, the invention will now be described in more detail.

Figure 1A:
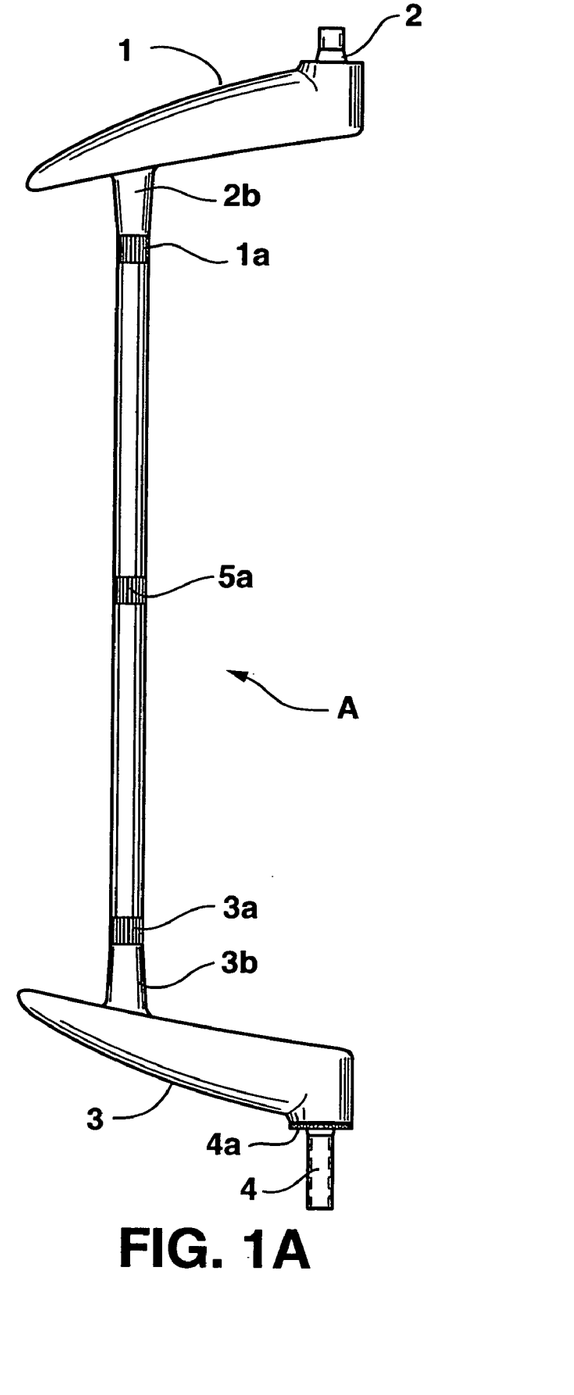
FIG. 1A is a side elevation illustrating a support arm according to the invention without a mirror head.

In the embodiment of FIG. 1A, a mirror support arm assembly, designated generally as A, is illustrated which includes a plastic upper holding arm (1) aerodynamically designed having a conically shaped attachment element (2) mounted on an end for attaching to the vehicle. In a similar manner, support arm assembly A includes a plastic lower holding arm (3) having an attachment element (4) on its end for attaching to the vehicle: Attachment element 4 is preferably in the form of a horizontal toothed raster (4a) with a cylindrical guiding. The attachment element may be fastened to a vehicle by means of a conventional pre-stressed spring and axial clamping ring (not shown), and locked into certain angle position relative to the vehicle by the teeth of raster 4a.

Figure 1B:
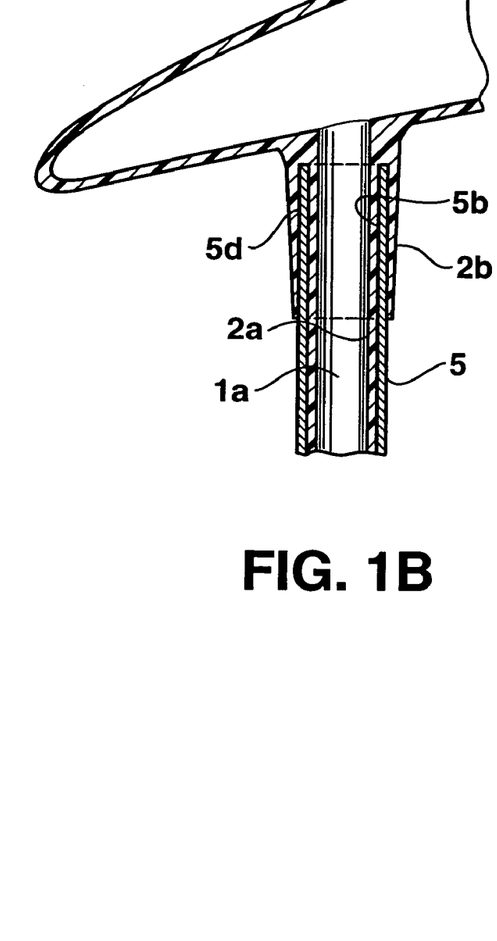
FIG. 1B is an enlarged elevation with the upper holding arm in section showing the support arm molded in the neck of the holding arm.
Figure 3A:
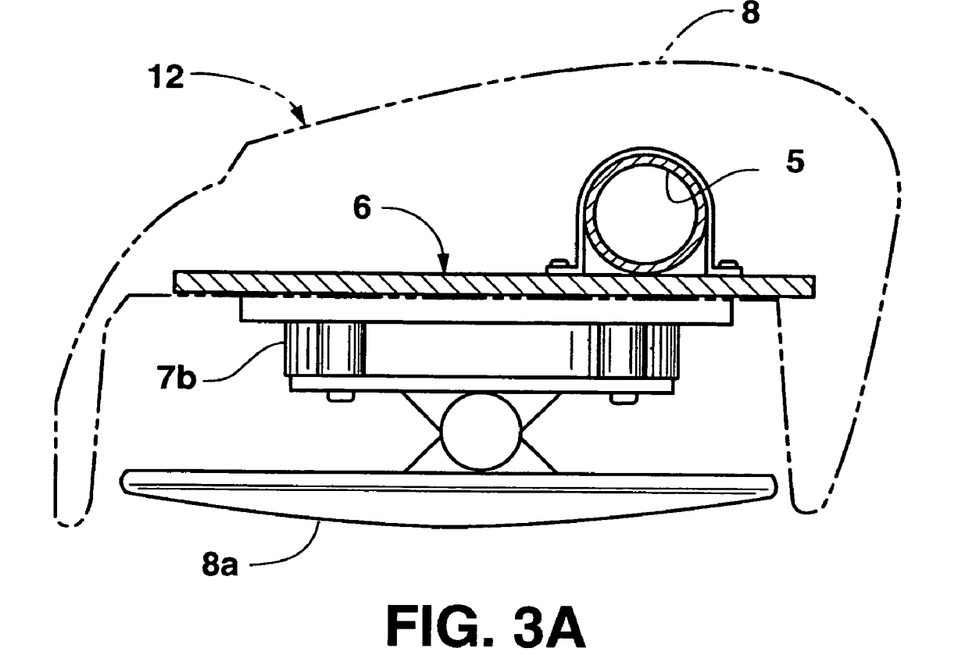
FIGS. 3A and 3B are top plan views illustrating a base plate and positioning wedge according to the support arm of FIG. 2 for the driver side and passenger side, respectively, of a right-hand driven vehicle.
Figure 7:
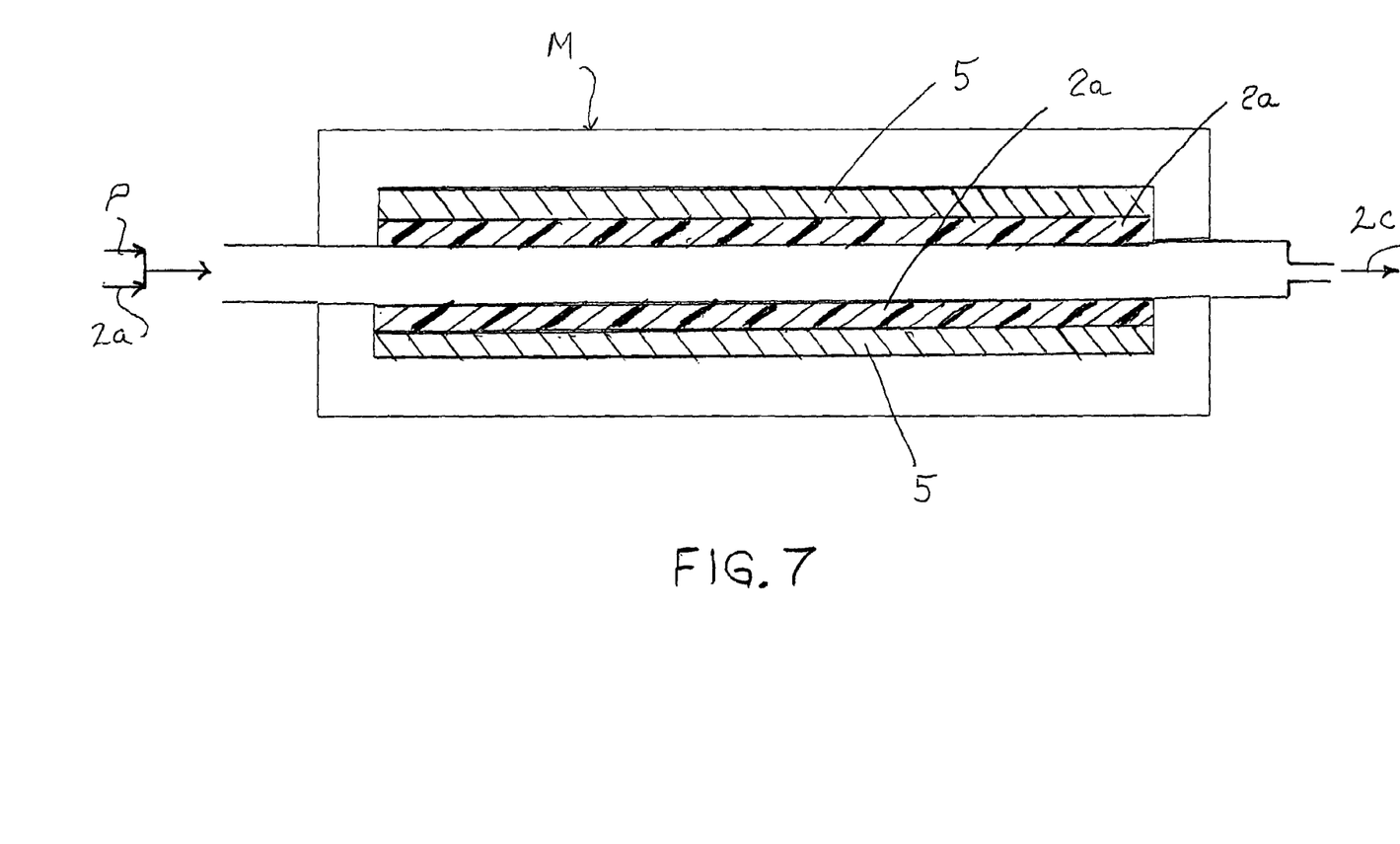
FIG. 7 is a schematic diagram of an internal fluid pressure process for forming a hollow plastic tube or other part for a support arm according to the invention.

The assembly includes a base provided in the form of a tube (5). As can best be seen in FIG. 1B, tube 5 is preferably a metal tube having a portion of its opposing ends prepared to provide spot faces 5b and 5d (not shown but identical) for securement with holding arms 1, 3. Preferably, the tube is secured by having spot faces 5b, 5d injection molded within the upper and/or lower holding arm. For this purpose, outer circumferential surface 5d of the tube is encapsulated in part by plastic material, and an inner circumferential surface 5b of the tube is encapsulated over Its entire length by plastic at 2a to form a plastic tube inside metal tube 5, and form the upper and tower holding arms. For this purpose, a neck 2b, 3b is formed on holding arms 2, 3, respectively, for receiving the ends of the tube. In this way, the supporting arm is integrally manufactured. As can best be seen in FIG. 7, an internal fluid pressure and injection molding process may be used to mold hollow plastic tube 2a within the support arm. Basically, plastic 2a is injected into mold "M" first, and then a pressurized fluid "P" is delivered to force excess plastic material from the mold at 2c to form a plastic tube with a hollow interior. Metal tube 5 and/or upper and lower holding arms 1, 3 have a vertical toothed connector section (1a, 5a, 5a) by which a mirror head or housing, such as 8 in FIGS. 3A and 3B, may be fastened to the tube in a specific angular position. The mirror head can be fastened to the metal tube or, as the case may be, the holding arms by means of clamps, plugs, screws, and the like.

Figure 2:
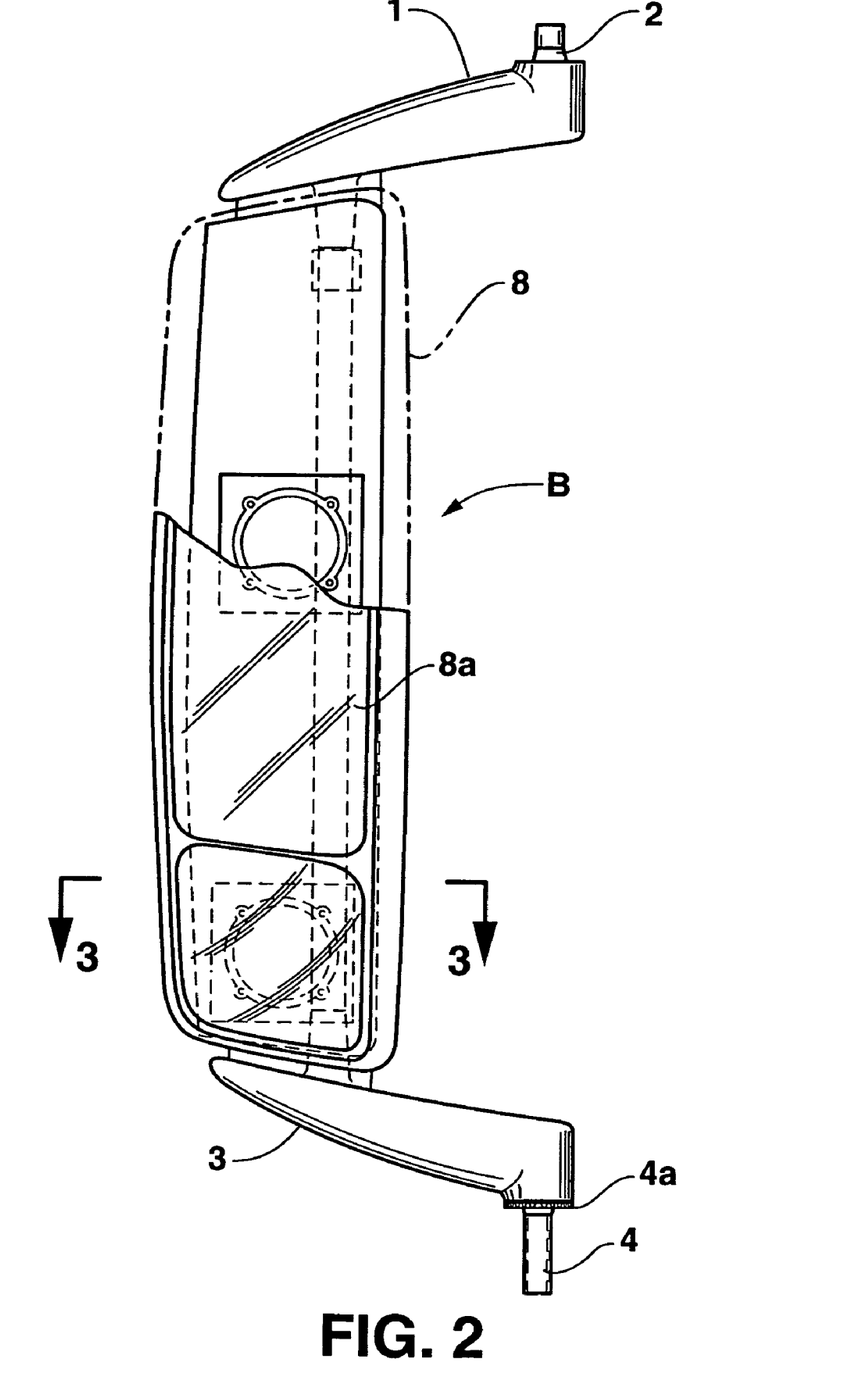
FIG. 2 is a side elevation illustrating a support arm according to another embodiment of the invention.

FIG. 2 shows a support arm B according to another embodiment of the present invention. This is assembled in a similar manner to the first embodiment and includes an upper and lower holding arm (1) and (3), as well as upper and lower attachment elements (2) and (4). However, other support arm configurations can also be utilized in which, for example, only one support arm is provided, or the base plate is secured to a tube bracket or a support arm made completely of plastic or even be integrally formed with this support arm. In the illustrated embodiment, the mirror head is formed by a base plate, designated generally as (9), having base attachment elements (7a, 7b) in the form of molded openings, notches, protrusions, screw holes, and the like in order to facilitate attaching mirror adjusting units 11, mirror panes 8a, and/or housing 8.

Figure 3B:
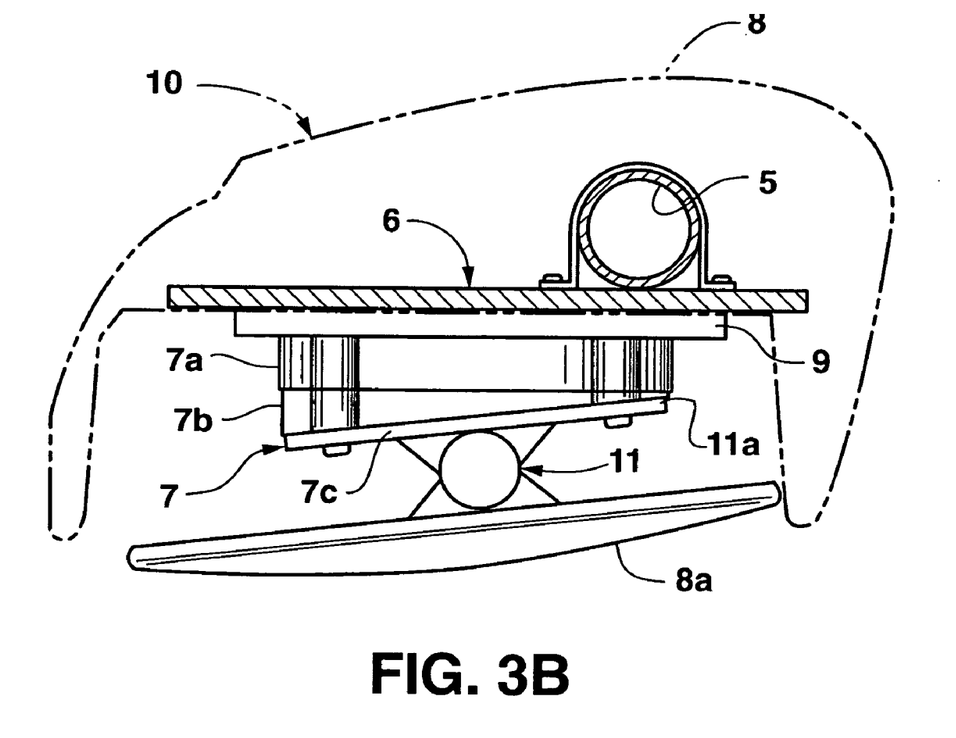
Figure 4:
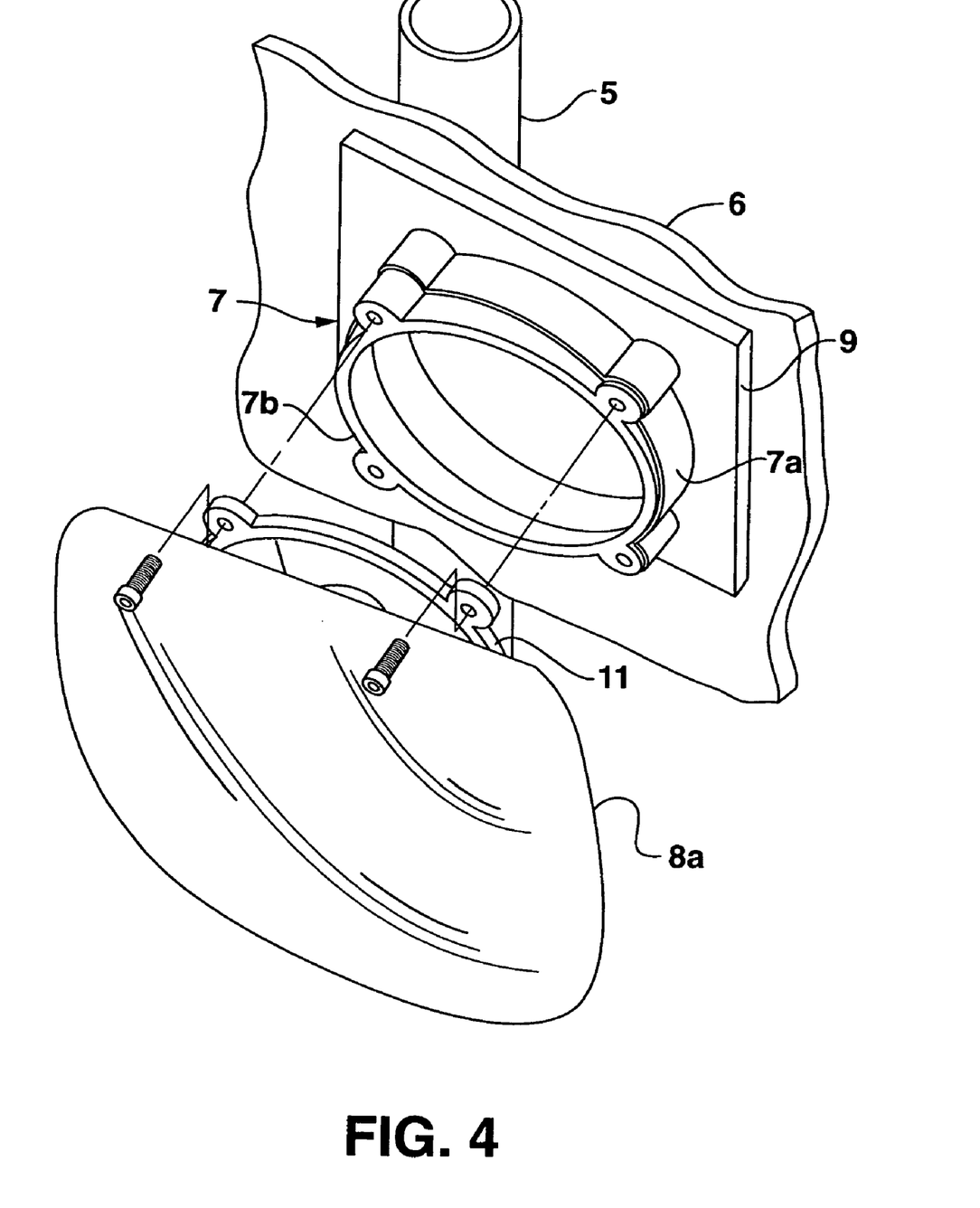
FIG. 4 is a perspective view of a base plate and positioning wedge for mounting a mirror pane to a support arm according to the invention.
Figure 5:
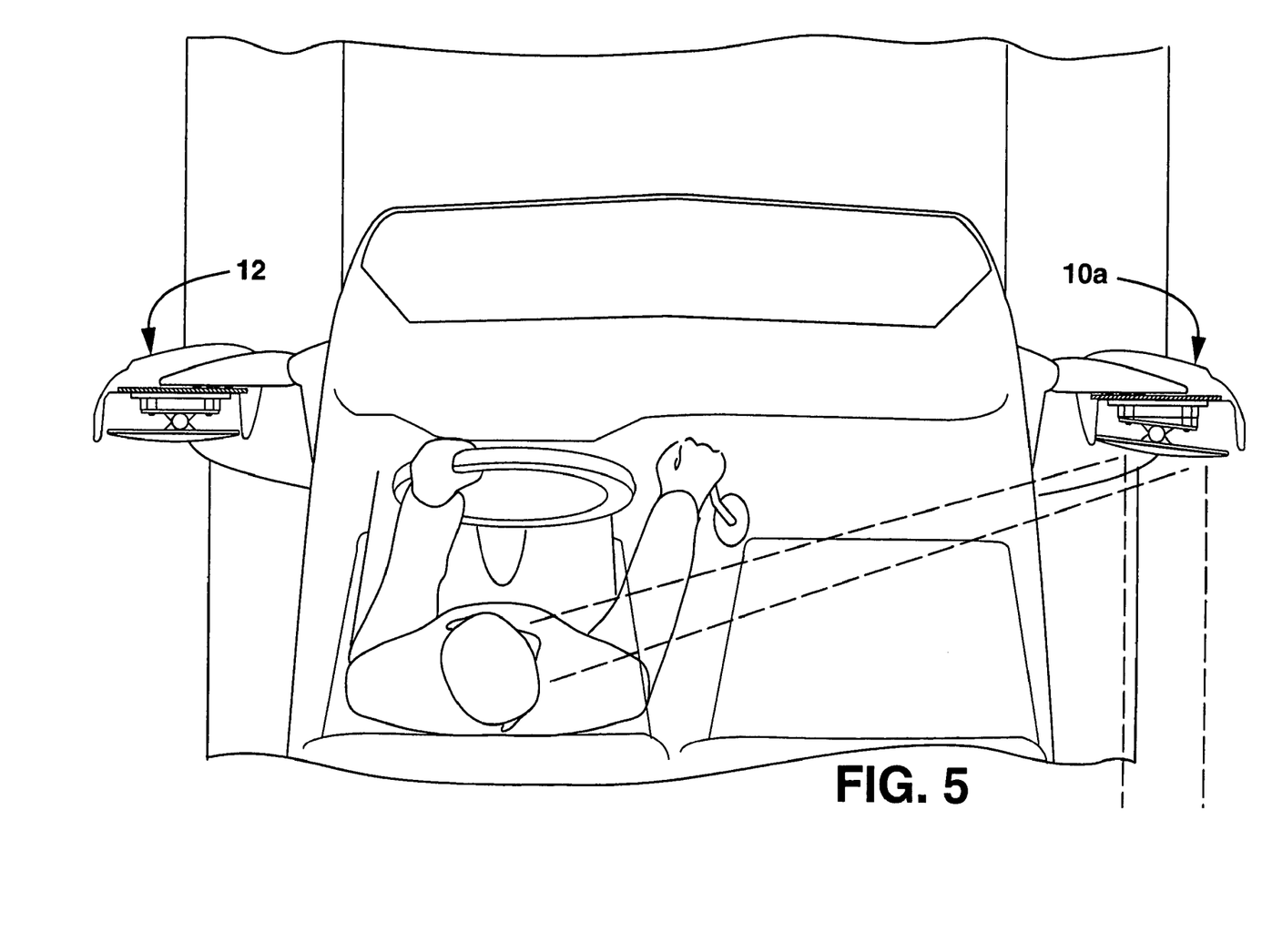
FIG. 5 is a schematic top view of a left-hand driven vehicle having driver side and passenger side mirror support arms according to the embodiment of the invention illustrated in FIG. 2.
Figure 6:
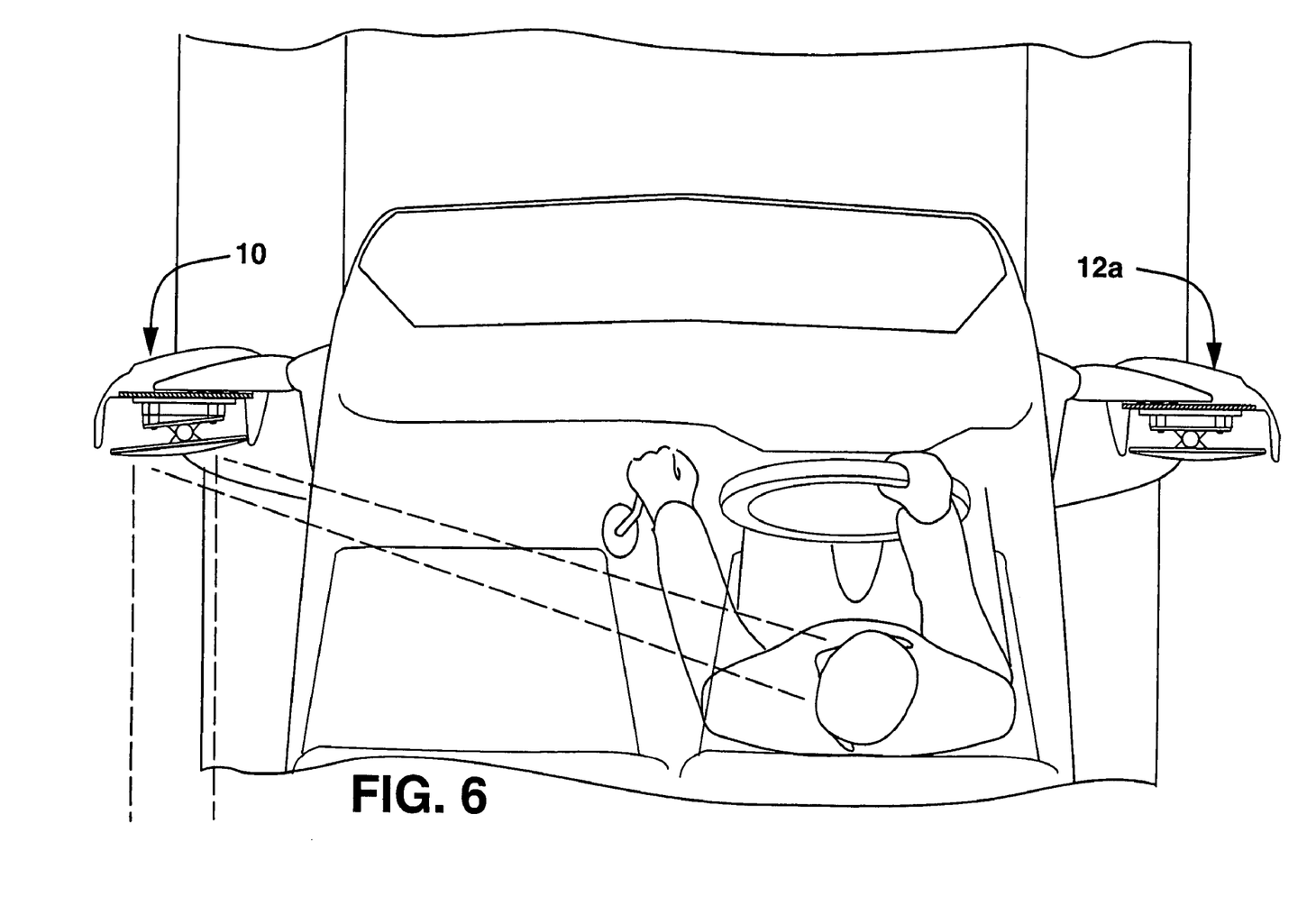
FIG. 6 is a schematic top view of a right-hand driven vehicle having driver side and passenger side mirror support arms according to the embodiment of the invention illustrated in FIG. 2.

As is best seen in the top plan view of FIG. 3B, base plate (9) includes a positioning wedge (7), at least at manufacture. A housing (8) and a mirror pane (8a) of the mirror head is secured to base plate 9 so that a passenger mirror (10) of a right-hand driven vehicle is provided (FIG. 6). For this purposes. adjusting unit 11, carrying mirror pane 8a, is attached to either a free base 7a or wedge 7b, which in turn is secured to base plate 9 of mirror 6. As illustrated, screw fasteners secure adjustment plate 11a and base 6 together as well as the intermediary parts. If the positioning wedge 7b is removed after manufacture, housing (8) and the mirror pane (8a) can be secured to the free base (7a), providing a more slightly inclined angle position and a driver mirror (12) for a left-hand driven vehicle (FIG. 5). In an analogical manner, the driver and passenger mirrors for right and left-hand driven vehicles, respectively, can be provided.

For example, for a right-hand driven vehicle, a driver mirror (12a) may be provided by flipping base plate (6) and housing (8) upside down and attaching the same to a support arm A on the right side of the vehicle as can best be seen in FIG. 6. For a right-hand driven passenger mirror (10a), base (6) and housing (8) of mirror (10) may be flipped and attached to the left side of the vehicle as can best be seen in FIG. 6.

To secure the housing or the mirror pane to the positioning wedge (7) or, should this be removed, free base (7a), the half-shell gear box described in the international patent application numbered WO 2002072386, or a similar adjustment unit is especially suitable. Therefore, the registration covers the entire content.

Thus, it can be seen, according to the present invention, a support arm assembly can be manufactured that can be used for both a passenger mirror for a right-hand driven or left-hand driven vehicle, a driver mirror for left-hand driven or right-hand driven vehicles. For this purpose, a support arm with a base plate is manufactured, to which a positioning wedge (7) is fixed. The positioning wedge is such that one side (7b) is inclined relative to the base plate, i.e. turned around a vertical axis of the vehicle in the installation position of the mirror. If the mirror head should be secured at a greater inclined position for the passenger side, its mirror pane and, if need be, housing (8) can be secured either directly or by means of an adjustment unit to the positioning wedge whose side (7a) is more inclined relative to base plate (6). For this purpose, the positioning wedge 7 has corresponding attachments, at least on its inclined side (7a).

In the event the mirror head needs to be set in the more slight driver-side angle position, the positioning wedge is removed and the mirror pane and the housing (8) are secured to the base plate (6), either directly or by means of an adjustment unit, without the positioning wedge. Advantageously, for this reason, the positioning wedge and the base plate have the same attachments for the mirror pane unit.

While a preferred embodiment of the invention has been described using specific terms, such description is for illustrative purposes only, and it is to be understood that changes and variations may be made without departing from the spirit or scope of the following claims.

We claim:

1. A support arm assembly for a vehicle mirror having at least one mirror head comprising:
    an upper holding arm having an upper attachment element for connection to a vehicle-mounted connector;
    a lower holding arm having a lower attachment element for the attachment to a vehicle-mounted connector;
    a base carried between said upper and lower holding arms;
    a removable positioning wedge carried by said base, and said positioning wedge having an installed position when carried by said base, and a removed position when said positioning wedge is removed from said base;
    a mirror pane carried by said base;
    said mirror pane carried by said base in a first mounted position at a first angle to said base when said positioning wedge is in said installed position, said mirror pane carried by said base in a second mounted position at a second angle to said base when said positioning wedge is in said removed position, and said first angle being greater than said second angle;
    whereby said support arm assembly may be used to mount a driver-side mirror when said positioning wedge is in said removed position or a passenger-side mirror when said positioning wedge is in said installed position.

2. The assembly of claim 1 wherein said base includes a metal tube having opposing ends injection molded with the upper and lower holding arms to form an integral support arm.

3. The assembly of claim 2 wherein said base includes a base plate carried by said metal tuber and said positioning wedge is removably mounted to said base plate.

4. The assembly of claim 3 wherein a mirror adjusting unit may be carried by said positioning wedge in said installed position, and said mirror adjusting unit may be carried by said base plate with said positioning wedge in said removed position.

5. The assembly of claim 4 including a housing carried by said metal tube for at least partially enclosing said metal tube, base plate, and positioning wedge when said mirror pane is carried in said first mounted position; and at least partially enclosing said metal tube and base plate when said mirror pane is carried in said second mounted position.

6. The assembly of claim 3 wherein one of said metal tube, holding arm, and lower holding arm, has a vertical toothed raster section for attachment of one of said base plate and a mirror head.

7. The assembly of claim 6 wherein one of said upper and lower holding arm includes a horizontal toothed raster for fixing the angular position of said holding arm on the vehicle.

8. The assembly of claim 7 wherein at least one mirror head that is fastened to the metal tube.

9. A support arm assembly for a vehicle mirror having at least one mirror head wherein said assembly includes a unitary support arm comprising:
an upper holding arm having an upper attachment element for connection to a vehicle-mounted connector;
a lower holding arm having a lower attachment element for the attachment to a vehicle-mounted connector;
a base including a metal tube carried between said upper and lower holding arms:
said metal tube having an upper end securely attached with said upper holding arm and a lower end securely attached to said lower holding arm: wherein,
one of said ends of said metal tube, said upper holding arm and said lower holding arm has a vertical toothed raster section for attachment of said mirror head.

10. The assembly of claim 9 wherein said metal tube has opposing ends injection molded with said upper and lower holding arms to provide a unitary structure.

11. The assembly of claim 10 wherein a plastic tube is injection molded within said metal tube integrally formed with the upper and lower holding arms.

12. The assembly of claim 11 wherein said plastic tube includes a hollow interior formed using an internal fluid pressure process.

13. The assembly of claim 9 where said metal tube is secured to the upper and lower holding arms by means of adhesive.

14. The assembly of claim 9 wherein one of said upper and lower holding arm includes a horizontal toothed raster for fixing the angular position of said support arm on the vehicle.

15. The assembly of claim 9 including at least one mirror head, said base including a base plate; a removable positioning wedge carried by said base plate with said mirror pane being carried by said base plate; said mirror pane being mounted at a first angle to said base plate when mounted to said positioning wedge, and said mirror pane being mounted at a second angle to said base plate when mounted to said base plate with said positioning wedge removed, and said first angle being greater than said second angle.

16. The assembly of claim 9 wherein at least a mirror head of said at least one mirror head is fastened to the support arm.

17. A method for manufacturing a support arm assembly for a vehicle mirror comprising the steps of:
providing a mirror support arm having a base; providing a removable positioning wedge with an inclined surface that may be removably mounted to said base; and
mounting a mirror pane to said base to provide one of a first angular position and a second angular position relative to said base by one of the following steps:
mounting the mirror pane to said inclined surface of said positioning wedge to provide said first angular position on said support arm for providing a passenger-side rear view mirror; or
removing said positioning wedge from said base, and attaching said mirror pane to said base to provide said second angular position on the support arm for providing a driver-side rear view mirror.

18. The method of claim 17 including molding and shaping upper and lower holding arms on opposing ends of said support arm to provide an integral support arm assembly, said holding arms being attachable to said vehicle.

19. The method of claim 17 including using an internal fluid pressure process to form hollow plastic components of said support arm assembly.

* * * * *